(12) United States Patent
Sharma (10) Patent No.: US 12,449,766 B2
(45) Date of Patent: Oct. 21, 2025

(54) HOLOGRAPHIC DISPLAY CALIBRATION

(71) Applicant: GM Global Technology Operations LLC, Detroit, MI (US)

(72) Inventor: Manoj Sharma, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 500 days.

(21) Appl. No.: 18/048,968

(22) Filed: Oct. 24, 2022

(65) Prior Publication Data
US 2024/0134316 A1    Apr. 25, 2024
US 2024/0231277 A9    Jul. 11, 2024

(51) Int. Cl.
*G03H 1/22*    (2006.01)
*B60K 35/00*   (2006.01)
*G02B 27/01*   (2006.01)

(52) U.S. Cl.
CPC .......... *G03H 1/2294* (2013.01); *B60K 35/00* (2013.01); *G02B 27/0103* (2013.01)

(58) Field of Classification Search
CPC .... G03H 1/2294; G03H 1/0808; B60K 35/00; B60K 35/211; G02B 27/0103
See application file for complete search history.

(56) References Cited

U.S. PATENT DOCUMENTS

| 11,442,543 B1* | 9/2022 | Rai Kurlethimar ..... G06F 3/012 |
| 2022/0111728 A1 | 4/2022 | Seder et al. |
| 2023/0190190 A1* | 6/2023 | Rich ..................... B60K 28/06 |
| | | 382/103 |

OTHER PUBLICATIONS

United States Patent and Trademark Office. U.S. Appl. No. 17/814,598, filed Jul. 25, 2022.

* cited by examiner

*Primary Examiner* — John R Wallace
(74) *Attorney, Agent, or Firm* — Vivacqua Crane, PLLC (57) ABSTRACT

A system for training a machine learning algorithm to generate a plurality of ideal hologram phase correction maps includes a holographic head-up display (HUD) configured to display a plurality of duplicates of a graphic based on a hologram phase map. The system further includes a camera system configured to view each of the plurality of duplicates of the graphic. The system further includes a controller in electrical communication with the holographic HUD and the camera system. The controller is programmed to determine a plurality of ground-truth hologram phase correction maps using a genetic algorithm, the holographic HUD, and the camera system. The controller is further programmed to generate a training dataset including a plurality of images of the graphic and train the machine learning algorithm to generate the plurality of ideal hologram phase correction maps.

16 Claims, 4 Drawing Sheets

HOLOGRAPHIC DISPLAY CALIBRATION

INTRODUCTION

The present disclosure relates to calibration systems and methods for holographic displays.

To increase occupant awareness, vehicles may be equipped with holographic displays, such as, for example, holographic head-up displays (HUD). Holographic displays are generally designed to provide information to an occupant of a vehicle without requiring the occupant to look away from the road, thus increasing occupant awareness and safety. Variations in materials, manufacturing, and/or installation of components of a holographic display may cause a need for calibration of the holographic display for proper operation. However, current holographic display calibration systems and methods may require specialized equipment, be time consuming, and/or be inefficient. Additionally, current holographic display calibration methods may need to be performed during vehicle manufacturing, increasing, for example, complexity of production.

Thus, while current systems and methods for holographic display calibration achieve their intended purpose, there is a need for a new and improved system and method for calibrating holographic displays.

SUMMARY

According to several aspects, a system for training a machine learning algorithm to generate a plurality of ideal hologram phase correction maps is provided. The system includes a holographic head-up display (HUD) configured to display a plurality of duplicates of a graphic based on a hologram phase map, where each of the plurality of duplicates of the graphic is displayed at one of a plurality of eyebox locations. The system further includes a camera system configured to view each of the plurality of duplicates of the graphic displayed by the holographic HUD. The system further includes a controller in electrical communication with the holographic HUD and the camera system. The controller is programmed to determine a plurality of ground-truth hologram phase correction maps using a genetic algorithm, the holographic HUD, and the camera system, where each of the plurality of ground-truth hologram phase correction maps corresponds to one of the plurality of eyebox locations. The controller is further programmed to generate a training dataset including a plurality of images of the graphic displayed at each of the plurality of eyebox locations and train the machine learning algorithm to generate the plurality of ideal hologram phase correction maps, wherein the machine learning algorithm is trained using at least the plurality of ground-truth hologram phase correction maps and the training dataset.

In another aspect of the present disclosure, to determine the plurality of ground-truth hologram phase correction maps using the genetic algorithm, the controller is further programmed to compute a graphic hologram phase map based on a target graphic to be displayed by the holographic HUD. For each of the plurality of eyebox locations, the controller is further programmed to generate a first generation, where the first generation includes a plurality of random hologram phase correction maps, and where each of the plurality of random hologram phase correction maps includes a plurality of random phase values. To determine the plurality of ground-truth hologram phase correction maps using the genetic algorithm, the controller is further programmed to, for each of the plurality of eyebox locations, generate S−1 generations, where each generation includes a plurality of hologram phase correction maps, where an Sth generation is a stopping generation, where an nth generation is based on an n−1th generation, and where n is an integer greater than 1 and less than or equal to S. To determine the plurality of ground-truth hologram phase correction maps using the genetic algorithm, the controller is further programmed to, for each of the plurality of eyebox locations, determine one of the plurality of ground-truth hologram phase correction maps corresponding to one of the plurality of eyebox locations based on the Sth generation of hologram phase correction maps.

In another aspect of the present disclosure, to generate the S−1 generations, the controller is further programmed to sort the plurality of hologram phase correction maps of the n−1th generation according to an error value of each of the plurality of hologram phase correction maps of the n−1th generation. To generate the S−1 generations, the controller is further programmed to generate at least one child based on at least one set of two parents, where each parent of the at least one set of two parents is selected from the plurality of hologram phase correction maps of the n−1th generation. To generate the S−1 generations, the controller is further programmed to generate the nth generation by replacing at least one of the plurality of hologram phase correction maps of the n−1th generation with the at least one child.

In another aspect of the present disclosure, to sort the plurality of hologram phase correction maps, the controller is further programmed to, for each of the plurality of hologram phase correction maps of the n−1th generation, add the graphic hologram phase map to one of the plurality of hologram phase correction maps to generate a corrected graphic hologram phase map. To sort the plurality of hologram phase correction maps, the controller is further programmed to, for each of the plurality of hologram phase correction maps of the n−1th generation, normalize each of a plurality of phases of the corrected graphic hologram phase map between zero and three hundred and sixty degrees. To sort the plurality of hologram phase correction maps, the controller is further programmed to, for each of the plurality of hologram phase correction maps of the n−1th generation, display a corrected graphic using the holographic HUD, where the corrected graphic is based on the corrected graphic hologram phase map. To sort the plurality of hologram phase correction maps, the controller is further programmed to, for each of the plurality of hologram phase correction maps of the n−1th generation, capture an image of the corrected graphic using the camera system. To sort the plurality of hologram phase correction maps, the controller is further programmed to, for each of the plurality of hologram phase correction maps of the n−1th generation, compare each pixel of a plurality of pixels of the image of the corrected graphic to each pixel of a plurality of pixels of the target graphic to determine an error value of the one of the plurality of hologram phase correction maps. To sort the plurality of hologram phase correction maps, the controller is further programmed to sort the plurality of hologram phase correction maps of the n−1th generation according to the error value of each of the plurality of hologram phase correction maps of the n−1th generation.

In another aspect of the present disclosure, to generate at the least one child based on the at least one set of two parents, the controller is further programmed to select the at least one set of two parents from the plurality of hologram phase correction maps of the n−1th generation using a weighted random selection, where the at least one set of two parents includes a first parent and a second parent, and where hologram phase correction maps of the n−1th generation having a lower error value have a higher probability of selection. To generate at the least one child based on the at least one set of two parents, the controller is further programmed to generate a random binary phase map, where each of a plurality of phases of the random binary phase map is either zero or one. To generate at the least one child based on the at least one set of two parents, the controller is further programmed to generate the at least one child, where the at least one child is a sum of the first parent multiplied by the random binary phase map and the second parent multiplied by an inverse of the random binary phase map. To generate at the least one child based on the at least one set of two parents, the controller is further programmed to mutate the at least one child, where mutating the at least one child includes increasing or decreasing at least one of a plurality of phases of the at least one child by a random phase amount.

In another aspect of the present disclosure, to generate the nth generation, the controller is further programmed to generate the nth generation, where the nth generation includes a carryover group of L hologram phase correction maps of the n−1th generation having the lowest error values, where L is equal to a total number of hologram phase correction maps in the n−1th generation minus a number of children generated, and where the nth generation further includes the at least one child of the n−1th generation.

In another aspect of the present disclosure, to determine the one of the plurality of ground-truth hologram phase correction maps corresponding to the one of the plurality of eyebox locations, the controller is further programmed to determine the one of the plurality of ground-truth hologram phase correction maps corresponding to the one of the plurality of eyebox locations to be one of the plurality of hologram phase correction maps of the Sth generation having a lowest error value.

In another aspect of the present disclosure, to generate the training dataset, the controller is further programmed to display the graphic using the holographic HUD. To generate the training dataset, the controller is further programmed to capture a plurality of images using the camera system, where each of the plurality of images includes one of the plurality of duplicates of the graphic displayed at one of the plurality of eyebox locations. To generate the training dataset, the controller is further programmed to save the training dataset to a non-transitory memory of the controller, where the training dataset includes the plurality of images.

In another aspect of the present disclosure, to generate the training dataset, the controller is further programmed to repeat the display, capture, and save steps using a plurality of different holographic HUD units such that influences due to manufacturing differences between individual holographic HUD units are included in the training dataset. To generate the training dataset, the controller is further programmed to repeat the display, capture, and save steps using a plurality of different graphics.

In another aspect of the present disclosure, to train the machine learning algorithm to generate the plurality of ideal hologram phase correction maps, the controller is further programmed to: train a convolutional neural network (CNN) using supervised learning, where the CNN is trained using the plurality of ground-truth hologram phase correction maps and the training dataset, where the CNN is trained to generate the plurality of ideal hologram phase correction maps based on an image of one of the plurality of duplicates of the graphic, and where each of the plurality of ideal hologram phase correction maps corresponds to one of the plurality of eyebox locations.

According to several aspects, a method for training a machine learning algorithm to generate a plurality of ideal hologram phase correction maps is provided. The method also includes determining a plurality of ground-truth hologram phase correction maps using a genetic algorithm, where each of the plurality of ground-truth hologram phase correction maps corresponds to one of a plurality of eyebox locations. The method also includes generating a training dataset including a plurality of images of a graphic displayed at each of the plurality of eyebox locations. The method also includes training the machine learning algorithm to generate the plurality of ideal hologram phase correction maps, wherein the machine learning algorithm is trained using at least the plurality of ground-truth hologram phase correction maps and the training dataset.

In another aspect of the present disclosure, the method for determining the plurality of ground-truth hologram phase correction maps further may include computing a graphic hologram phase map based on a target graphic to be displayed by a holographic head-up display (HUD). For each of the plurality of eyebox locations, the method also includes generating a first generation, where the first generation includes a plurality of random hologram phase correction maps, and where each of the plurality of random hologram phase correction maps includes a plurality of random phase values. For each of the plurality of eyebox locations, the method also includes generating S−1 generations, where each generation includes a plurality of hologram phase correction maps, where an Sth generation is a stopping generation, where an nth generation is based on an n−1th generation, and where n is an integer greater than 1 and less than or equal to S. For each of the plurality of eyebox locations, the method also includes determining one of the plurality of ground-truth hologram phase correction maps corresponding to one of the plurality of eyebox locations based on the Sth generation of hologram phase correction maps.

In another aspect of the present disclosure, generating the S−1 generations further may include sorting the plurality of hologram phase correction maps of the n−1th generation according to an error value of each of the plurality of hologram phase correction maps of the n−1th generation. The method also includes generating at least one child based on at least one set of two parents, where each parent of the at least one set of two parents is selected from the plurality of hologram phase correction maps of the n−1th generation. The method also includes generating the nth generation by replacing at least one of the plurality of hologram phase correction maps of the n−1th generation with the at least one child. Generating the nth generation further may include generating the nth generation, where the nth generation includes a group of L hologram phase correction maps of the n−1th generation having the lowest error values, where L is equal to a total number of hologram phase correction maps in the n−1th generation minus a number of children generated, and where the nth generation further includes the at least one child of the n−1th generation.

In another aspect of the present disclosure, sorting each of the plurality of hologram phase correction maps further may include, for each of the plurality of hologram phase correction maps of the n−1th generation, adding the graphic hologram phase map to one of the plurality of hologram phase correction maps to generate a corrected graphic hologram phase map. Sorting each of the plurality of hologram phase correction maps further may include, for each of the plurality of hologram phase correction maps of the n−1th generation, normalizing each of a plurality of phases of the corrected graphic hologram phase map between zero and three hundred and sixty degrees. Sorting each of the plurality of hologram phase correction maps further may include, for each of the plurality of hologram phase correction maps of the n−1th generation, displaying a corrected graphic using the holographic HUD, where the corrected graphic is based on the corrected graphic hologram phase map. Sorting each of the plurality of hologram phase correction maps further may include, for each of the plurality of hologram phase correction maps of the n−1th generation, capturing an image of the corrected graphic using a camera system; and comparing each pixel of a plurality of pixels of the image of the corrected graphic to each of a plurality of pixels of the target graphic to determine an error value of the one of the plurality of hologram phase correction maps. Sorting each of the plurality of hologram phase correction maps further may include sorting the plurality of hologram phase correction maps of the n−1th generation according to the error value of each of the plurality of hologram phase correction maps of the n−1th generation.

In another aspect of the present disclosure, generating the at least one child based on the at least one set of two parents further may include selecting the at least one set of two parents from the plurality of hologram phase correction maps of the n−1th generation using a weighted random selection, where the at least one set of two parents includes a first parent and a second parent, and where hologram phase correction maps of the n−1th generation having a lower error value have a higher probability of selection. Generating the at least one child based on the at least one set of two parents further may include generating a random binary phase map, where each of a plurality of phases of the random binary phase map is either zero or one. Generating the at least one child based on the at least one set of two parents further may include generating the at least one child, where the at least one child is a sum of the first parent multiplied by the random binary phase map and the second parent multiplied by an inverse of the random binary phase map. Generating the at least one child based on the at least one set of two parents further may include mutating the at least one child, where mutating the at least one child includes increasing or decreasing at least one of a plurality of phases of the at least one child by a random phase amount.

In another aspect of the present disclosure, determining the one of the plurality of ground-truth hologram phase correction maps corresponding to the one of the plurality of eyebox locations further may include determining the one of the plurality of ground-truth hologram phase correction maps corresponding to the one of the plurality of eyebox locations to be one of the plurality of hologram phase correction maps of the Sth generation having a lowest error value.

In another aspect of the present disclosure, generating the training dataset further may include displaying the graphic using the holographic HUD and capturing a plurality of images using a camera system, wherein each of the plurality of images includes one of a plurality of duplicates of the graphic displayed at one of the plurality of eyebox locations. Generating the training dataset further may include saving the training dataset to a non-transitory memory of a controller, wherein the training dataset includes the plurality of images.

According to several aspects, a system for calibrating a holographic display for a vehicle is provided. The system includes a holographic head-up display (HUD) configured to display a plurality of duplicates of a graphic based on a hologram phase map, where each of the plurality of duplicates of the graphic is displayed at one of a plurality of eyebox locations. The system also includes a camera configured to view one of the plurality of duplicates of the graphic. The system also includes a controller in electrical communication with the holographic HUD, and the camera, where the controller includes a non-transitory memory. The controller is programmed to compute a graphic hologram phase map based on the graphic, display the graphic hologram phase map using the holographic HUD, and capture an image of the one of the plurality of duplicates of the graphic using the camera. The controller is further programmed to calculate a plurality of hologram phase correction maps, where each of the plurality of hologram phase correction maps corresponds to one of the plurality of eyebox locations. The controller is further programmed to save the plurality of hologram phase correction maps in the non-transitory memory of the controller.

In another aspect of the present disclosure, the system further includes an occupant position tracking device and the controller is further programmed to determine an eyellipse location using the occupant position tracking device, where the eyellipse location is a location of an eyellipse of an occupant of the vehicle. The controller is further programmed to identify a selected eyebox location, where the selected eyebox location is one of the plurality of eyebox locations which is closest in proximity to the eyellipse location. The controller is further programmed to retrieve a selected one of the plurality of hologram phase correction maps from the non-transitory memory of the controller, where the selected one of the plurality of hologram phase correction maps corresponds to the selected eyebox location. The controller is further programmed to compute a corrected graphic hologram phase map, where the corrected graphic hologram phase map is a sum of the selected one of the plurality of hologram phase correction maps and the graphic hologram phase map. The controller is further programmed to display the corrected graphic hologram phase map using the holographic HUD.

In another aspect of the present disclosure, to calculate the plurality of hologram phase correction maps, the controller is further programmed to determine a plurality of ground-truth hologram phase correction maps using a genetic algorithm, wherein each of the plurality of ground-truth hologram phase correction maps corresponds to one of the plurality of eyebox locations. The controller is further programmed to generate a training dataset including a plurality of images of the graphic displayed at each of the plurality of eyebox locations. The controller is further programmed to train a machine learning algorithm to generate the plurality of hologram phase correction maps, wherein the machine learning algorithm is trained using at least the plurality of ground-truth hologram phase correction maps and the training dataset.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
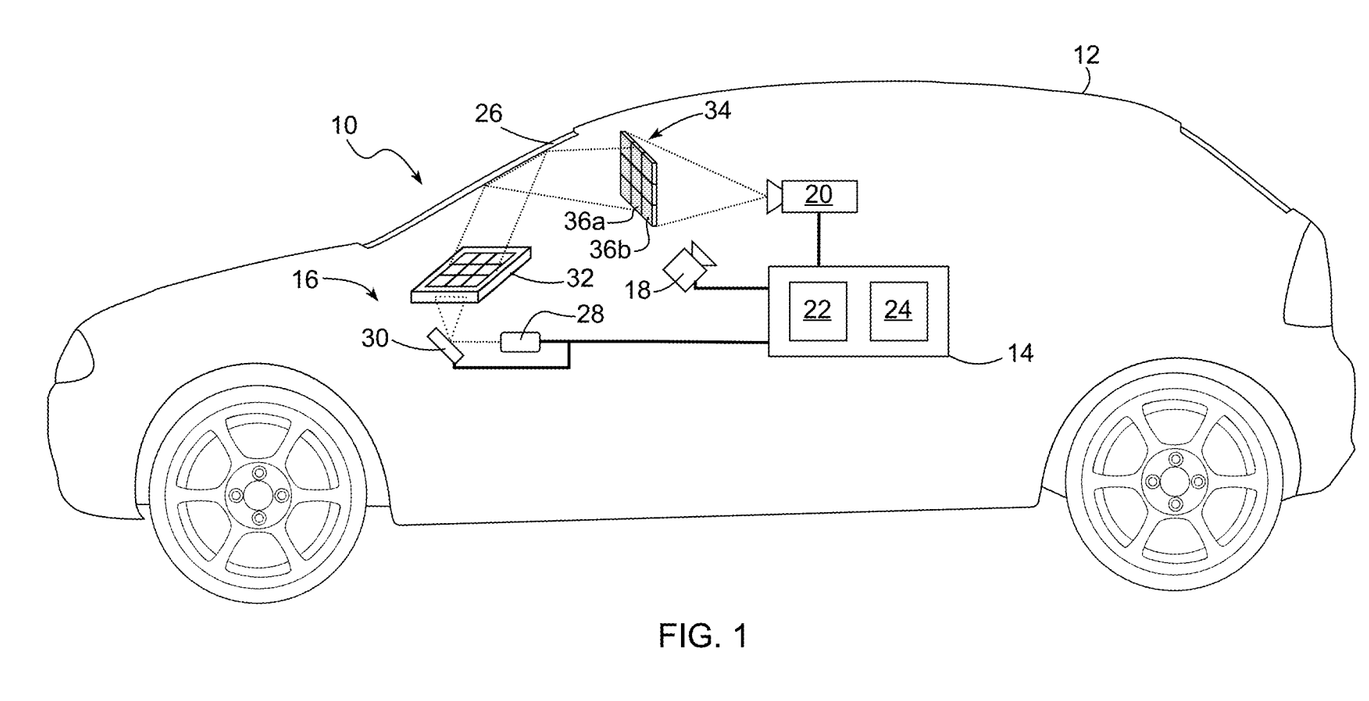
FIG. 1 is a schematic diagram of a system for generating and utilizing a plurality of ideal hologram phase correction maps according to an exemplary embodiment.

Referring to FIG. 1, a system for generating and utilizing a plurality of ideal hologram phase correction maps is illustrated and generally indicated by reference number 10. The system 10 is shown with an exemplary vehicle 12. While a passenger vehicle is illustrated, it should be appreciated that the vehicle 12 may be any type of vehicle without departing from the scope of the present disclosure. The system 10 generally includes a controller 14, a holographic head-up display (HUD) 16, an occupant position tracking device 18, and a camera system 20.

The controller 14 is used to implement a method 100 for training a machine learning algorithm to generate a plurality of ideal hologram phase correction maps, and a method 200 for calibrating a holographic display for a vehicle, as will be described below. The controller 14 includes at least one processor 22 and a non-transitory computer readable storage device or media 24. The processor 22 may be a custom made or commercially available processor, a central processing unit (CPU), a graphics processing unit (GPU), an auxiliary processor among several processors associated with the controller 14, a semiconductor-based microprocessor (in the form of a microchip or chip set), a macroprocessor, a combination thereof, or generally a device for executing instructions. The computer readable storage device or media 24 may include volatile and nonvolatile storage in read-only memory (ROM), random-access memory (RAM), and keep-alive memory (KAM), for example. KAM is a persistent or non-volatile memory that may be used to store various operating variables while the processor 22 is powered down. The computer-readable storage device or media 24 may be implemented using a number of memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions, used by the controller 14 to control various systems of the vehicle 12. The controller 14 may also consist of multiple controllers which are in electrical communication with each other. The controller 14 may be inter-connected with additional systems and/or controllers of the vehicle 12, allowing the controller 14 to access data such as, for example, speed, acceleration, braking, and steering angle of the vehicle 12.

The controller 14 is in electrical communication with the holographic HUD 16, the occupant position tracking device 18, and the camera system 20. In an exemplary embodiment, the electrical communication is established using, for example, a CAN bus, a Wi-Fi network, a cellular data network, or the like. It should be understood that various additional wired and wireless techniques and communication protocols for communicating with the controller 14 are within the scope of the present disclosure.

The holographic HUD 16 is used to display a graphic (e.g., vehicle speed, navigation information, and/or safety information) on a windscreen 26 of the vehicle 12. In the exemplary embodiment depicted in FIG. 1, the holographic HUD 16 includes a laser 28, a spatial light modulator (SLM) 30, and a pupil replicator 32. The laser 28 projects a plane of light which illuminates the SLM 30. The plane of light is reflected by the SLM 30 and passes through the pupil replicator 32 before reflecting off the windscreen 26 and towards an occupant of the vehicle 12. The holographic HUD 16, including the laser 28, SLM 30, and pupil replicator 32, is in electrical communication with the controller 14 as described above.

The laser 28 is used to illuminate the SLM 30 using a plane of light. In an exemplary embodiment, the laser 28 is an optoelectronic device which emits a plane of spatially and temporally coherent light.

The SLM 30 is an electrical device which imposes a spatially varying modulation (e.g., intensity modulation or phase modulation) on a beam and/or plane of light. In an exemplary embodiment, the SLM 30 includes a grid of liquid crystals. By applying a voltage to one of the liquid crystals, the liquid crystal changes orientation, thus changing a phase angle of a light wave which is reflected by the liquid crystal. By selectively applying a particular voltage to each of the liquid crystals in the grid of the SLM 30, a phase of light reflected by the SLM 30 is spatially varied. By spatially varying the phase of the reflected light, the SLM 30 produces an image which is visible to the occupant. In a non-limiting example, to display a desired graphic to the occupant, the controller 14 generates a graphic hologram phase map based on the graphic. The graphic hologram phase map is a two-dimensional matrix containing a phase value for each liquid crystal in the grid of liquid crystals of the SLM 30. The controller 14 commands the SLM 30 to orient each liquid crystal of the grid of liquid crystals of the SLM 30 according to the phase values in the graphic hologram phase map. Therefore, the phase of the light reflected by the SLM 30 is spatially phase modulated to form the graphic.

The pupil replicator 32 is an optical device which is used to produce a plurality of duplicates of the graphic which is displayed by the SLM 30. In an exemplary embodiment, the pupil replicator 32 is an optical waveguide which is configured to produce nine duplicates of the graphic. Each of the plurality of duplicates of the graphic are reflected off the windscreen 26. One of each of the nine duplicates of the graphic is visible from one of a plurality of eyeboxes 34. In the scope of the present disclosure, each eyebox (e.g., 36a, 36b) of the plurality of eyeboxes 34 defines a particular area in space inside of the vehicle 12 from which a duplicate of the graphic is visible. In other words, the occupant will observe a different one of the plurality of duplicates of the graphic from the perspective of each eyebox (e.g., 36a, 36b) of the plurality of eyeboxes 34. In the scope of the present disclosure, the term eyellipse refers to a location of the eyes of the occupant in the vehicle 12, as determined by the occupant position tracking device 18 (discussed in further detail below). Therefore, if the eyellipse of the occupant is within a first eyebox 36a of the plurality of eyeboxes 34, the occupant will observe one of the plurality of duplicates of the graphic which is displayed within the first eyebox 36a.

The occupant position tracking device 18 is used to determine a position of the occupant in the vehicle 12. In the scope of the present disclosure, the occupant includes, in a non-limiting example, a driver, a passenger, and/or any additional persons in the vehicle 12. For example, the occupant position tracking device 18 may track a position of a head or eyes of the occupant. In a non-limiting example, the occupant position tracking device 18 determines the eyellipse of the occupant of the vehicle 12. In an exemplary embodiment, the occupant position tracking device 18 is one or more cameras disposed in the vehicle 12. The occupant position tracking device 18 is in electrical communication with the controller 14 as described above.

The camera system 20 is used to capture images of the plurality of eyeboxes 34. In an exemplary embodiment, the camera system 20 includes one or more cameras disposed in the vehicle 12, for example, in a headliner of the vehicle 12. In another exemplary embodiment, the camera system 20 includes a single camera attached to robotic arm which is temporarily affixed within the vehicle 12. In this manner, the robotic arm may move the camera such that images of each eyebox (e.g., 36*a*, 36*b*) of the plurality of eyeboxes 34 may be captured. In yet another exemplary embodiment, the camera system 20 includes an array of cameras temporarily or permanently disposed within the vehicle 12, wherein each camera of the array of cameras is configured to view the first eyebox 36*a* of the plurality of eyeboxes 34. In yet another exemplary embodiment, the camera system 20 includes a single camera temporarily or permanently disposed within the vehicle 12, wherein the single camera is configured to view the first eyebox 36*a* of the plurality of eyeboxes 34. It should be understood that cameras having various sensor types including, for example, charge-coupled device (CCD) sensors, complementary metal oxide semiconductor (CMOS) sensors, and/or high dynamic range (HDR) sensors are within the scope of the present disclosure. Furthermore, cameras having various lens types including, for example, wide-angle lenses and/or narrow-angle lenses are also within the scope of the present disclosure. The camera system 20 is in electrical communication with the controller 14 as described above.

Due to variation in materials, manufacturing, and installation of the holographic HUD 16 and the windscreen 26, error may be introduced, causing the graphic viewed by the occupant to appear noisy and/or unfocused. In a non-limiting example, error is introduced by the SLM 30, pupil replicator 32, and/or the windscreen 26. Accordingly, it is desirable to calibrate the holographic HUD 16 using the method 100 for training a machine learning algorithm to generate a plurality of ideal hologram phase correction maps and the method 200 for calibrating a holographic display for a vehicle, as will be discussed below.

Figure 2A:
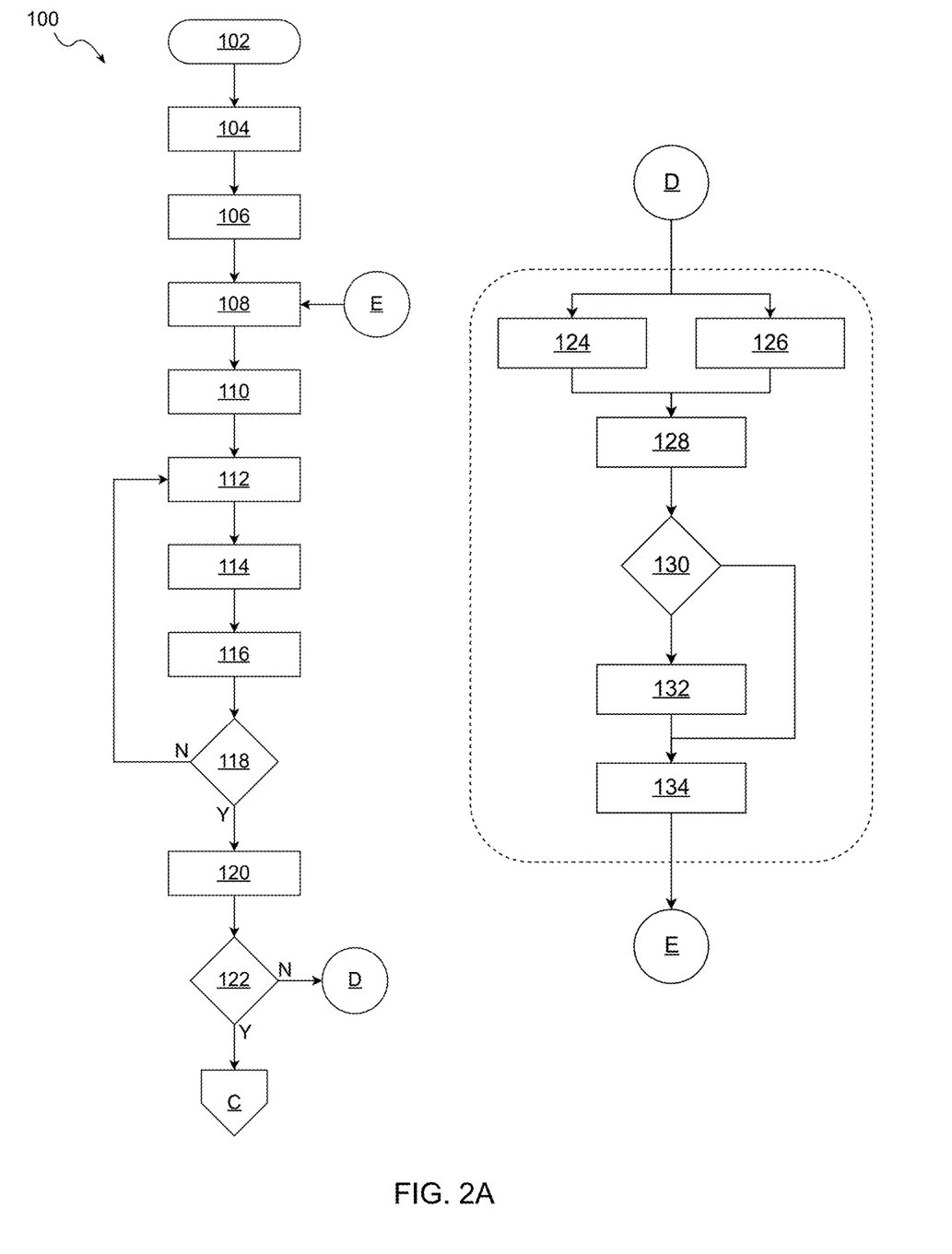
FIG. 2A is a flowchart of a method for training a machine learning algorithm to generate a plurality of ideal hologram phase correction maps according to an exemplary embodiment.

Referring to FIG. 2A a flowchart of the method 100 for training a machine learning algorithm to generate a plurality of ideal hologram phase correction maps is provided. In the scope of the present disclosure, a hologram phase correction map is a two-dimensional matrix containing a phase correction value for each liquid crystal in the grid of liquid crystals of the SLM 30. By adding the hologram phase correction map to the graphic hologram phase map, the hologram phase map is corrected to account for errors introduced by variations in the system 10. As discussed above, the graphic hologram phase map is a two-dimensional matrix containing a phase value for each liquid crystal in the grid of liquid crystals of the SLM 30. The phase values in the graphic hologram phase map are computed such that the light emitted by the laser 28 and reflected by the SLM 30 reproduces the graphic.

The method 100 begins at block 102 and proceeds to block 104. At block 104, the controller 14 computes a graphic hologram phase map based on a graphic which is to be displayed using the holographic HUD 16 (i.e., a target graphic). After block 104, the method 100 proceeds to block 106.

At block 106, the controller 14 generates a first generation for a genetic algorithm. The first generation includes a plurality of random hologram phase correction maps. In the scope of the present disclosure, a random hologram phase correction map is a hologram phase correction map having a random phase correction value for each liquid crystal in the grid of liquid crystals of the SLM 30. After block 106, the method 100 proceeds to block 108.

At block 108, the graphic hologram phase map is added to each of a plurality of hologram phase correction maps of the current generation (e.g., each of the plurality of random hologram phase correction maps of the first generation) to create a plurality of corrected graphic hologram phase maps. After block 108, the method 100 proceeds to block 110.

At block 110, each of the plurality of corrected graphic hologram phase maps is normalized between zero and three hundred and sixty degrees (i.e., two multiplied by pi radians). Each of the plurality of corrected graphic hologram phase maps is normalized because the SLM 30 is only capable of a phase shift of between zero and three hundred and sixty degrees using each liquid crystal in the grid of liquid crystals of the SLM 30. After block 110, the method 100 proceeds to block 112.

At block 112, the holographic HUD 16 is used to display a corrected graphic based on one of the plurality of corrected graphic hologram phase maps normalized at block 110. After block 112, the method 100 proceeds to block 114.

At block 114, the camera system 20 is used to capture an image of the graphic from the perspective of the first eyebox 36*a* of the plurality of eyeboxes 34. After block 114, the method 100 proceeds to block 116.

At block 116, the image captured at block 114 is compared to the graphic which was used at block 104 to compute the graphic hologram phase map. In an exemplary embodiment, each pixel of a plurality of pixels of the image captured at block 114 is compared to a corresponding pixel of the graphic to determine an error value of the one of the plurality of hologram phase correction maps of block 108 which corresponds to the one of the plurality of corrected graphic hologram phase maps displayed at block 112. In a non-limiting example, the error value is a percentage of non-matching pixels between the image captured at block 114 and the graphic which was used at block 104 to compute the graphic hologram phase map. After block 116, the method 100 proceeds to block 118.

At block 118, if an error value has been calculated for each of the plurality of hologram phase correction maps of block 108, the method 100 proceeds to block 120. Otherwise, the method 100 returns to block 112 such that a next one of the plurality of corrected graphic hologram phase maps of block 110 is displayed, imaged, and the corresponding error value determined. Thus, the method 100 repeats block 112-118 until an error value has been determined for each of the plurality of hologram phase correction maps of block 108.

At block 120, the plurality of hologram phase correction maps of block 108 are sorted according to the error value corresponding to each of the plurality of hologram phase correction maps determined at blocks 112-118. In an exemplary embodiment, the plurality of hologram phase correction maps are sorted in ascending order of error value. After block 120, the method 100 proceeds to block 122.

At block 122, the controller 14 determines whether a stopping condition has been reached for the genetic algorithm of method 100. In an exemplary embodiment, to determine the stopping condition, the controller 14 compares the hologram phase correction map having a lowest error value to a predetermined error threshold. If the error value of the hologram phase correction map having the lowest error value is less than or equal to the predetermined error threshold, the genetic algorithm is stopped, the hologram phase correction map having the lowest error value is determined to be a ground-truth hologram phase correction map for the first eyebox 36*a*, and the method 100 proceeds to block C as will be discussed in reference to FIG. 2B. If the error value of the hologram phase correction map having the lowest error value is not less than or equal to the predetermined error threshold, the method 100 proceeds to block D. After block D, the method 100 proceeds to blocks 124 and 126.

At block 124, at least one set of two parents is selected from the plurality of hologram phase correction maps. Each parent of the at least one set of two parents is a hologram phase correction map. In an exemplary embodiment, the at least one set of two parents is selected using a weighted random selection, wherein hologram phase correction maps having a lower error value have a higher probability of selection.

At block 126, a random binary phase map is generated. The random binary phase map is a two-dimensional matrix having the same dimensions as each of the plurality of hologram phase correction maps, and therefore the same dimensions as each parent of the at least one set of parents selected at block 124. Each value in the random binary phase map is randomly chosen to be either zero or one, such that the random binary phase map acts as a binary mask when multiplied by a hologram phase correction map. After blocks 124 and 126, the method 100 proceeds to block 128.

At block 128, at least one child is generated using the at least one set of parents selected at block 124 and the random binary phase map generated at block 126. In an exemplary embodiment, the at least one child is the sum of a first parent of the at least one set of parents multiplied by the random binary phase map and a second parent of the at least one set of parents multiplied by an inverse of the random binary phase map. The inverse of the random binary phase map is generated by changing every one in the random binary phase map to a zero, and every zero in the random binary phase map to a one. In other words, the at least one child is a random combination of phase values from the first parent and the second parent. After block 128, the method 100 proceeds to block 130.

At block 130, a random chance is decided. In an exemplary embodiment, a number between 0 and 1 is randomly chosen. If the number is greater than or equal to a predetermined chance threshold, the method 100 proceeds to block 132. If the number is less than the predetermined chance threshold, the method 100 bypasses block 132 and proceeds instead to block 134. In a non-limiting example, the predetermined chance threshold is one-half. In a further non-limiting example, the predetermined chance threshold is one-fourth.

At block 132, the at least one child generated at block 128 is mutated. To mutate the at least one child, at least one of the plurality of phase values of the at least one child is increased or decreased by a random phase amount. In an exemplary embodiment, a number of phase values of the at least one child is first chosen at random. Then, a random phase amount is chosen at random for each of the randomly chosen phase values of the at least one child. Then, each random phase amount is either subtracted from or added to each of the randomly chosen phase values of the at least one child by random chance. After block 132, the method 100 proceeds to block 134.

At block 134, a next generation is generated. To generate the next generation, a carryover group of hologram phase correction maps having the lowest error values is selected from the current generation. The carryover group includes a number L of hologram phase correction maps, wherein L is equal to the total number of hologram phase correction maps in the current generation minus a number of children generated at block 128. The next generation includes carryover group and the at least one child of the current generation. After block 134, the method 100 proceeds to block E. After block E, the method 100 proceeds to block 108.

Therefore, the method 100 repeats blocks 108-134 in a loop, generating a new generation during each cycle of the loop, until the stopping condition is reached at block 122 and the method 100 proceeds to block C. In the scope of the present disclosure, the current generation is referred to as the "n−1th generation", the next generation is referred to as the "nth generation", and a stopping generation (i.e., a last generation generated before the stopping condition is reached at block 122) is referred to as the "Sth generation".

Figure 2B:
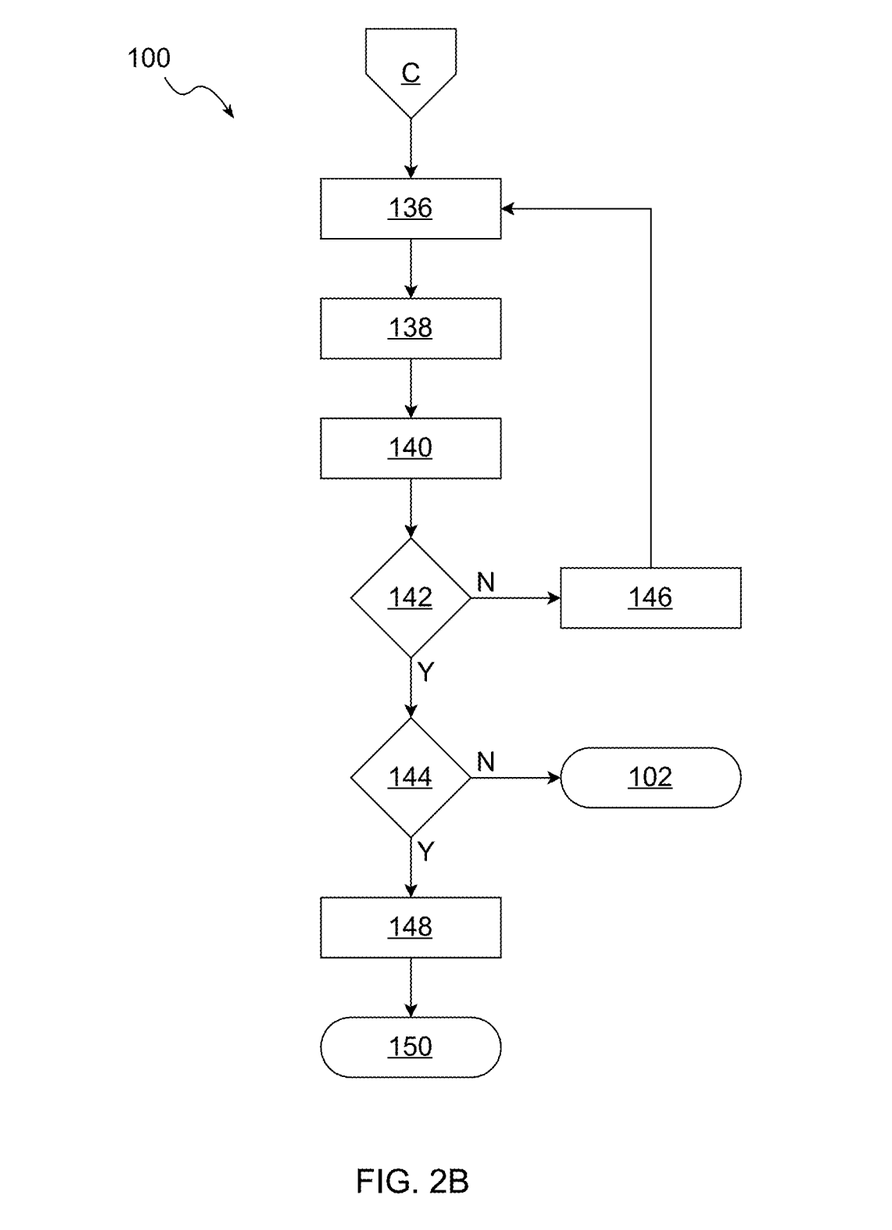
FIG. 2B is a continuation of the flowchart of FIG. 2A according to an exemplary embodiment.

Referring to FIG. 2B, a continuation of the flowchart for the method 100 is provided. After block C, the method 100 proceeds to block 136. At block 136, the controller 14 displays the graphic based on the graphic hologram phase map computed at block 104 using the holographic HUD 16. After block 136, the method 100 proceeds to block 138.

At block 138, the camera system 20 is used to capture an image of the graphic displayed at block 136 from the perspective of the first eyebox 36*a* of the plurality of eyeboxes 34. After block 138, the method 100 proceeds to block 140.

At block 140, the image captured at block 138 is saved in the media 24 of the controller 14 as a pair with the ground-truth hologram phase correction map for the first eyebox 36*a* determined at block 122, such that the image captured at block 138 and the ground-truth hologram phase correction map for the first eyebox 36*a* determined at block 122 are linked in the media 24 of the controller 14. The images saved at block 140 are referred to as a training dataset for the first eyebox 36*a*. After block 140, the method 100 proceeds to block 142.

At block 142, a stopping condition is evaluated. In an exemplary embodiment, if a number of images saved in the media 24 of the controller 14 is greater than or equal to a predetermined stopping threshold (e.g., one thousand images), the method 100 proceeds to block 144. If the number of images saved in the media 24 of the controller 14 is less than the predetermined stopping threshold, the method 100 proceeds to block 146.

At block 146, the controller 14 computes a second graphic hologram phase map based on a second graphic which is to be displayed using the holographic HUD 16. In an exemplary embodiment, at block 146, the windscreen 26 and/or the holographic HUD 16 is replaced with another unit. By replacing components of the system 10, effects of variation in materials, manufacturing, and installation of the holographic HUD 16 and the windscreen 26 are accounted for in the training dataset. By saving images of multiple distinct graphics, the training dataset is more diverse and thus more effective for machine learning training. After block 146, the method 100 returns to block 136.

At block 144, if images of each of the plurality of eyeboxes 34 have been captured at block 140, the method 100 proceeds to block 148. If images of each of the plurality of eyeboxes 34 have not been captured at block 140, the method 100 returns to block 102 to determine the ground-truth hologram phase correction map for a second eyebox 36b and save a training dataset for the second eyebox 36b. Therefore, blocks 102-144 of the method 100 are repeated until a training dataset has been saved for each of the plurality of eyeboxes 34.

At block 148, the machine learning algorithm is trained to generate the plurality of ideal hologram phase correction maps, wherein each of the plurality of ideal hologram phase correction maps corresponds to one of the plurality of eyeboxes 34. In an exemplary embodiment, the machine learning algorithm is a convolutional neural network (CNN). To train the CNN, supervised learning is performed using the training datasets saved at block 140, including the plurality of ground-truth hologram phase correction maps. The CNN is trained to receive a single image captured by the camera system 20 of a graphic displayed by the holographic HUD 16 from a perspective of a single eyebox (e.g., 36a, 36b) of the plurality of eyeboxes 34 as input and output the plurality of ideal hologram phase correction maps, wherein each of the plurality of ideal hologram phase correction maps corresponds to one of the plurality of eyeboxes 34. Therefore, after block 148, the trained CNN may be used to generate the plurality of ideal hologram phase correction maps, as will be discussed in reference to FIG. 3 and the method 200 below. After block 148, the method 100 enters a standby state at block 150.

Figure 3:
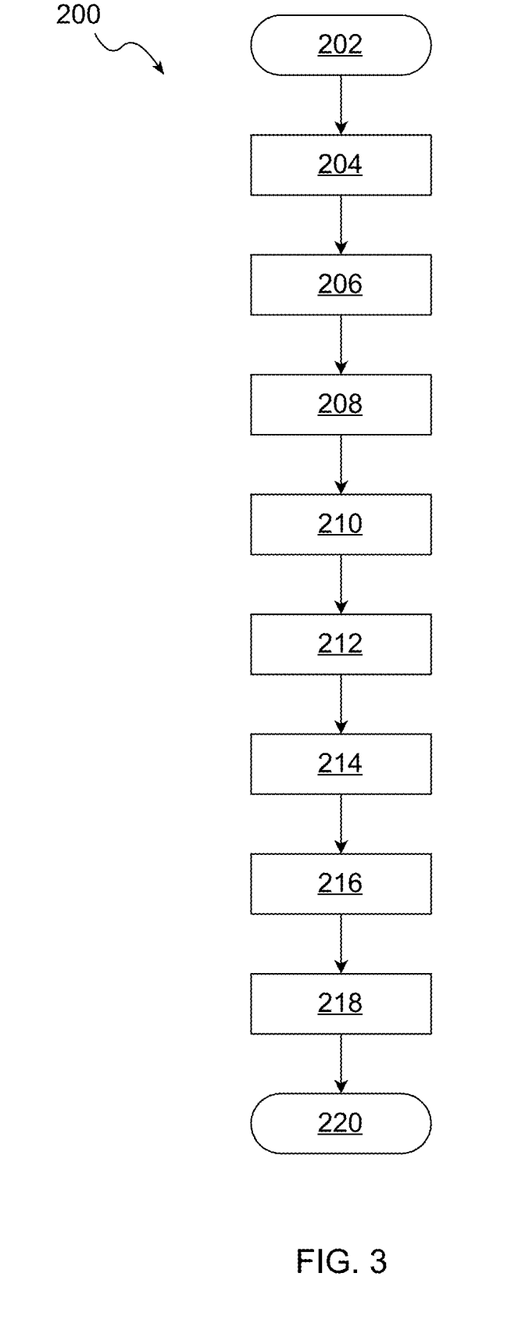
FIG. 3 is a flowchart of a method for calibrating a holographic display for a vehicle according to an exemplary embodiment.

Referring to FIG. 3, a flowchart of the method 200 for calibrating a holographic display for a vehicle is provided. The method 200 begins at block 202 and proceeds to block 204. At block 204, the controller 14 computes a graphic hologram phase map based on a desired graphic to be displayed using the holographic HUD 16. After block 204, the method 200 proceeds to block 206.

At block 206, the holographic HUD 16 is used to display a plurality of duplicates of the graphic based on the graphic hologram phase map computed at block 204, wherein each of the plurality of duplicates is visible from the perspective of one of the plurality of eyeboxes 34. After block 206, the method 200 proceeds to block 208.

At block 208, the controller 14 captures an image of one of the plurality of duplicates of the graphic using the camera system 20. After block 208, the method 200 proceeds to block 210.

At block 210, the controller 14 calculates a plurality of ideal hologram phase correction maps using the method 100 as described above. Each of the plurality of ideal hologram phase correction maps corresponds to one of the plurality of eyeboxes 34. The plurality of ideal hologram phase correction maps are saved in the media 24 of the controller 14. After block 210, the method 200 proceeds to block 212.

At block 212, the controller 14 determines an eyellipse location of the occupant using the occupant position tracking device 18. As described above, the term eyellipse refers to a location of the eyes of the occupant in the vehicle 12. After block 212, the method 200 proceeds to block 214.

At block 214, the controller 14 identifies a selected eyebox location, wherein the selected eyebox location is an eyebox (e.g., 36a, 36b) of the plurality of eyeboxes 34 which is closest in proximity to the eyellipse location determined at block 212. Based on the selected eyebox location, the controller 14 retrieves a selected one of the plurality of ideal hologram phase correction maps from the media 24. The selected one of the plurality of ideal hologram phase correction maps corresponds to the selected eyebox location. After block 214, the method 200 proceeds to block 216.

At block 216, the controller 14 computes a corrected hologram phase map by adding the selected one of the plurality of ideal hologram phase correction maps retrieved at block 214 to the graphic hologram phase map computed at block 204. After block 216, the method 200 proceeds to block 218.

At block 218, the holographic HUD 16 is used to display a plurality of duplicates of the graphic based on the corrected graphic hologram phase map computed at block 216, wherein each of the plurality of duplicates is visible from the perspective of one of the plurality of eyeboxes 34. After block 218, the method 200 proceeds to enter a standby state at block 220.

The system 10 and methods 100, 200 of the present disclosure offer several advantages. By training a machine learning algorithm to generate the plurality of ideal hologram phase correction maps based on a single image from the perspective of a single eyebox (e.g., 36a, 36b) of the plurality of eyeboxes 34 using the method 100, the method 200 may be used to generate the plurality of ideal hologram phase correction maps. The method 200 allows for generation of the plurality of ideal hologram phase correction maps using a single image, rather than a plurality of images, providing a reduction in cost, time, and complexity during the calibration process.

The description of the present disclosure is merely exemplary in nature and variations that do not depart from the gist of the present disclosure fare intended to be within the scope of the present disclosure. Such variations are not to be regarded as a departure from the spirit and scope of the present disclosure.

What is claimed is:

1. A system for training a machine learning algorithm to generate a plurality of ideal hologram phase correction maps, the system comprising:
   a holographic head-up display (HUD) configured to display a plurality of duplicates of a graphic based on a hologram phase map, wherein each of the plurality of duplicates of the graphic is displayed at one of a plurality of eyebox locations;
   a camera system configured to view each of the plurality of duplicates of the graphic displayed by the holographic HUD; and
   a controller in electrical communication with the holographic HUD and the camera system, wherein the controller is programmed to:
      determine a plurality of ground-truth hologram phase correction maps using a genetic algorithm, the holographic HUD, and the camera system, wherein each of the plurality of ground-truth hologram phase correction maps corresponds to one of the plurality of eyebox locations;
      generate a training dataset including a plurality of images of the graphic displayed at each of the plurality of eyebox locations, wherein to generate the training dataset, the controller is further programmed to:
         display the graphic using the holographic HUD;
         capture a plurality of images using the camera system, wherein each of the plurality of images includes one of the plurality of duplicates of the graphic displayed at one of the plurality of eyebox locations;
         save the training dataset to a non-transitory memory of the controller, wherein the training dataset includes the plurality of images;

repeat the display, capture, and save steps using a plurality of different holographic HUD units such that influences due to manufacturing differences between individual holographic HUD units are included in the training dataset; and repeat the display, capture, and save steps using a plurality of different graphics; and train the machine learning algorithm to generate the plurality of ideal hologram phase correction maps, wherein the machine learning algorithm is trained using at least the plurality of ground-truth hologram phase correction maps and the training dataset.

2. The system of claim 1, wherein to determine the plurality of ground-truth hologram phase correction maps using the genetic algorithm, the controller is further programmed to:

compute a graphic hologram phase map based on a target graphic to be displayed by the holographic HUD; and for each of the plurality of eyebox locations:

generate a first generation, wherein the first generation includes a plurality of random hologram phase correction maps, and wherein each of the plurality of random hologram phase correction maps includes a plurality of random phase values;

generate S−1 generations, wherein each generation includes a plurality of hologram phase correction maps, wherein an Sth generation is a stopping generation, wherein an nth generation is based on an n−1th generation, and wherein n is an integer greater than 1 and less than or equal to S; and determine one of the plurality of ground-truth hologram phase correction maps corresponding to one of the plurality of eyebox locations based on the Sth generation of hologram phase correction maps.

3. The system of claim 2, wherein to generate the S−1 generations, the controller is further programmed to:

sort the plurality of hologram phase correction maps of the n−1th generation according to an error value of each of the plurality of hologram phase correction maps of the n−1th generation;

generate at least one child based on at least one set of two parents, wherein each parent of the at least one set of two parents is selected from the plurality of hologram phase correction maps of the n−1th generation; and generate the nth generation by replacing at least one of the plurality of hologram phase correction maps of the n−1th generation with the at least one child.

4. The system of claim 3, wherein to sort the plurality of hologram phase correction maps, the controller is further programmed to:

for each of the plurality of hologram phase correction maps of the n−1th generation:

add the graphic hologram phase map to one of the plurality of hologram phase correction maps to generate a corrected graphic hologram phase map;

normalize each of a plurality of phases of the corrected graphic hologram phase map between zero and three hundred and sixty degrees;

display a corrected graphic using the holographic HUD, wherein the corrected graphic is based on the corrected graphic hologram phase map;

capture an image of the corrected graphic using the camera system; and compare each pixel of a plurality of pixels of the image of the corrected graphic to each pixel of a plurality of pixels of the target graphic to determine an error value of the one of the plurality of hologram phase correction maps; and sort the plurality of hologram phase correction maps of the n−1th generation according to the error value of each of the plurality of hologram phase correction maps of the n−1th generation.

5. The system of claim 3, wherein to generate at the at least one child based on the at least one set of two parents, the controller is further programmed to:

select the at least one set of two parents from the plurality of hologram phase correction maps of the n−1th generation using a weighted random selection, wherein the at least one set of two parents includes a first parent and a second parent, and wherein hologram phase correction maps of the n−1th generation having a lower error value have a higher probability of selection;

generate a random binary phase map, wherein each of a plurality of phases of the random binary phase map is either zero or one;

generate the at least one child, wherein the at least one child is a sum of the first parent multiplied by the random binary phase map and the second parent multiplied by an inverse of the random binary phase map; and mutate the at least one child, wherein mutating the at least one child includes increasing or decreasing at least one of a plurality of phases of the at least one child by a random phase amount.

6. The system of claim 3, wherein to generate the nth generation, the controller is further programmed to:

generate the nth generation, wherein the nth generation includes a carryover group of L hologram phase correction maps of the n−1th generation having the lowest error values, wherein L is equal to a total number of hologram phase correction maps in the n−1th generation minus a number of children generated, and wherein the nth generation further includes the at least one child of the n−1th generation.

7. The system of claim 3, wherein to determine the one of the plurality of ground-truth hologram phase correction maps corresponding to the one of the plurality of eyebox locations, the controller is further programmed to:

determine the one of the plurality of ground-truth hologram phase correction maps corresponding to the one of the plurality of eyebox locations to be one of the plurality of hologram phase correction maps of the Sth generation having a lowest error value.

8. The system of claim 1, wherein to train the machine learning algorithm to generate the plurality of ideal hologram phase correction maps, the controller is further programmed to:

train a convolutional neural network (CNN) using supervised learning, wherein the CNN is trained using the plurality of ground-truth hologram phase correction maps and the training dataset, wherein the CNN is trained to generate the plurality of ideal hologram phase correction maps based on an image of one of the plurality of duplicates of the graphic, and wherein each of the plurality of ideal hologram phase correction maps corresponds to one of the plurality of eyebox locations.

9. A method for training a machine learning algorithm to generate a plurality of ideal hologram phase correction maps, the method comprising:

determining a plurality of ground-truth hologram phase correction maps using a genetic algorithm, wherein each of the plurality of ground-truth hologram phase correction maps corresponds to one of a plurality of eyebox locations, wherein determining the plurality of ground-truth hologram phase correction maps further comprises:

computing a graphic hologram phase map based on a target graphic to be displayed by a holographic head-up display (HUD); and for each of the plurality of eyebox locations:
generating a first generation, wherein the first generation includes a plurality of random hologram phase correction maps, and wherein each of the plurality of random hologram phase correction maps includes a plurality of random phase values;
generating S-1 generations, wherein each generation includes a plurality of hologram phase correction maps, wherein an Sth generation is a stopping generation, wherein an nth generation is based on an n-1th generation, and wherein n is an integer greater than 1 and less than or equal to S; and
determining one of the plurality of ground-truth hologram phase correction maps corresponding to one of the plurality of eyebox locations based on the Sth generation of hologram phase correction maps;

generating a training dataset including a plurality of images of a graphic displayed at each of the plurality of eyebox locations; and training the machine learning algorithm to generate the plurality of ideal hologram phase correction maps, wherein the machine learning algorithm is trained using at least the plurality of ground-truth hologram phase correction maps and the training dataset.

10. The method of claim 9, wherein:
generating the S-1 generations further comprises:
sorting the plurality of hologram phase correction maps of the n-1th generation according to an error value of each of the plurality of hologram phase correction maps of the n-1th generation;
generating at least one child based on at least one set of two parents, wherein each parent of the at least one set of two parents is selected from the plurality of hologram phase correction maps of the n-1th generation; and
generating the nth generation by replacing at least one of the plurality of hologram phase correction maps of the n-1th generation with the at least one child; and
generating the nth generation further comprises:
generating the nth generation, wherein the nth generation includes a group of L hologram phase correction maps of the n-1th generation having the lowest error values, wherein L is equal to a total number of hologram phase correction maps in the n-1th generation minus a number of children generated, and wherein the nth generation further includes the at least one child of the n-1th generation.

11. The method of claim 10, wherein sorting each of the plurality of hologram phase correction maps further comprises:
for each of the plurality of hologram phase correction maps of the n-1th generation:
adding the graphic hologram phase map to one of the plurality of hologram phase correction maps to generate a corrected graphic hologram phase map;
normalizing each of a plurality of phases of the corrected graphic hologram phase map between zero and three hundred and sixty degrees;
displaying a corrected graphic using the holographic HUD, wherein the corrected graphic is based on the corrected graphic hologram phase map;
capturing an image of the corrected graphic using a camera system; and
comparing each pixel of a plurality of pixels of the image of the corrected graphic to each of a plurality of pixels of the target graphic to determine an error value of the one of the plurality of hologram phase correction maps; and
sorting the plurality of hologram phase correction maps of the n-1th generation according to the error value of each of the plurality of hologram phase correction maps of the n-1th generation.

12. The method of claim 10, generating the at least one child based on the at least one set of two parents further comprises:
selecting the at least one set of two parents from the plurality of hologram phase correction maps of the n-1th generation using a weighted random selection, wherein the at least one set of two parents includes a first parent and a second parent, and wherein hologram phase correction maps of the n-1th generation having a lower error value have a higher probability of selection;
generating a random binary phase map, wherein each of a plurality of phases of the random binary phase map is either zero or one;
generating the at least one child, wherein the at least one child is a sum of the first parent multiplied by the random binary phase map and the second parent multiplied by an inverse of the random binary phase map; and
mutating the at least one child, wherein mutating the at least one child includes increasing or decreasing at least one of a plurality of phases of the at least one child by a random phase amount.

13. The method of claim 10, wherein determining the one of the plurality of ground-truth hologram phase correction maps corresponding to the one of the plurality of eyebox locations further comprises:
determining the one of the plurality of ground-truth hologram phase correction maps corresponding to the one of the plurality of eyebox locations to be one of the plurality of hologram phase correction maps of the Sth generation having a lowest error value.

14. The method of claim 10, wherein generating the training dataset further comprises:
displaying the graphic using the holographic HUD;
capturing a plurality of images using a camera system, wherein each of the plurality of images includes one of a plurality of duplicates of the graphic displayed at one of the plurality of eyebox locations; and
saving the training dataset to a non-transitory memory of a controller, wherein the training dataset includes the plurality of images.

15. A system for calibrating a holographic display for a vehicle, the system comprising:
a holographic head-up display (HUD) configured to display a plurality of duplicates of a graphic based on a hologram phase map, wherein each of the plurality of duplicates of the graphic is displayed at one of a plurality of eyebox locations;
a camera configured to view one of the plurality of duplicates of the graphic;
an occupant position tracking device; and a controller in electrical communication with the holographic HUD, the camera, and the occupant position tracking device, wherein the controller includes a non-transitory memory, and wherein the controller is programmed to:
   compute a graphic hologram phase map based on the graphic;
   display the graphic hologram phase map using the holographic HUD;
   capture an image of the one of the plurality of duplicates of the graphic using the camera;
   calculate a plurality of hologram phase correction maps, wherein each of the plurality of hologram phase correction maps corresponds to one of the plurality of eyebox locations;
   save the plurality of hologram phase correction maps in the non-transitory memory of the controller;
   determine an eyellipse location using the occupant position tracking device, wherein the eyellipse location is a location of an eyellipse of an occupant of the vehicle;
   identify a selected eyebox location, wherein the selected eyebox location is one of the plurality of eyebox locations which is closest in proximity to the eyellipse location;
   retrieve a selected one of the plurality of hologram phase correction maps from the non-transitory memory of the controller, wherein the selected one of the plurality of hologram phase correction maps corresponds to the selected eyebox location;
   compute a corrected graphic hologram phase map, wherein the corrected graphic hologram phase map is a sum of the selected one of the plurality of hologram phase correction maps and the graphic hologram phase map; and
   display the corrected graphic hologram phase map using the holographic HUD.

16. The system of claim 15, wherein to calculate the plurality of hologram phase correction maps, the controller is further programmed to:
   determine a plurality of ground-truth hologram phase correction maps using a genetic algorithm, wherein each of the plurality of ground-truth hologram phase correction maps corresponds to one of the plurality of eyebox locations;
   generate a training dataset including a plurality of images of the graphic displayed at each of the plurality of eyebox locations; and
   train a machine learning algorithm to generate the plurality of hologram phase correction maps, wherein the machine learning algorithm is trained using at least the plurality of ground-truth hologram phase correction maps and the training dataset.

\* \* \* \* \*